March 31, 1964   R. R. JARBOE, JR., ET AL   3,126,742
LIQUID LEVEL INDICATING TOOL
Filed March 14, 1960   4 Sheets-Sheet 1
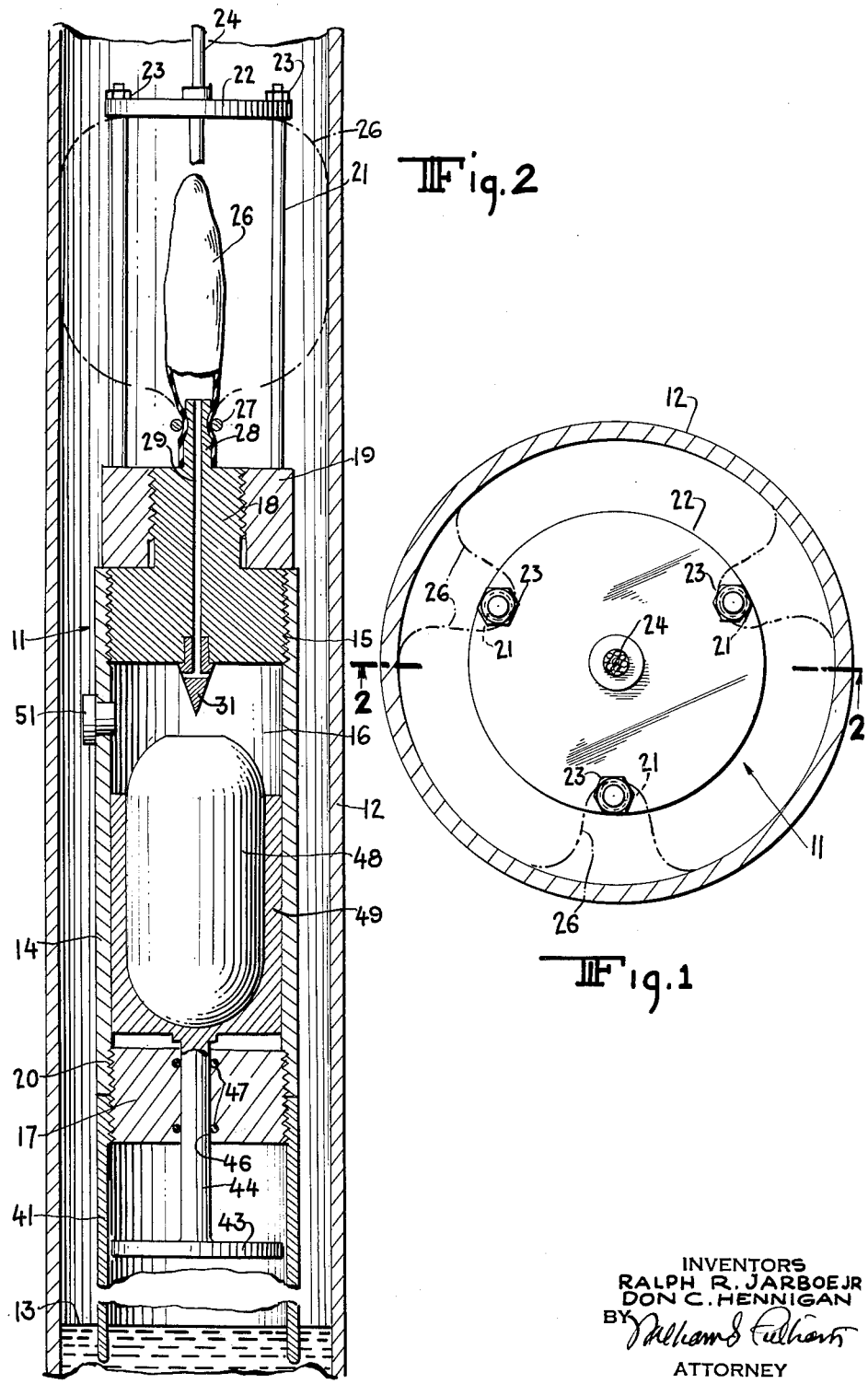
INVENTORS
RALPH R. JARBOE JR
DON C. HENNIGAN
BY
ATTORNEY

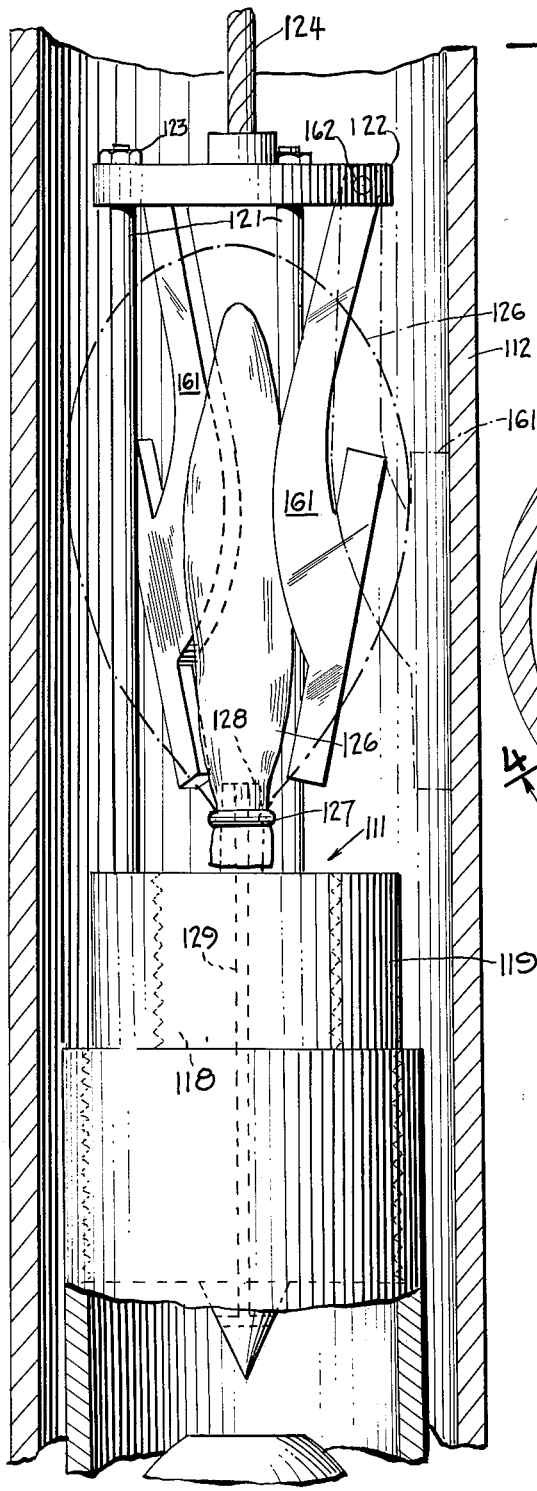
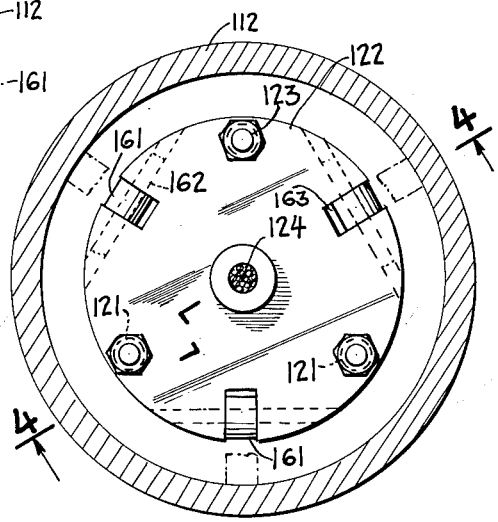
Fig. 4
Fig. 3
INVENTORS
RALPH R. JARBOE JR.
DON C. HENNIGAN
BY
ATTORNEY

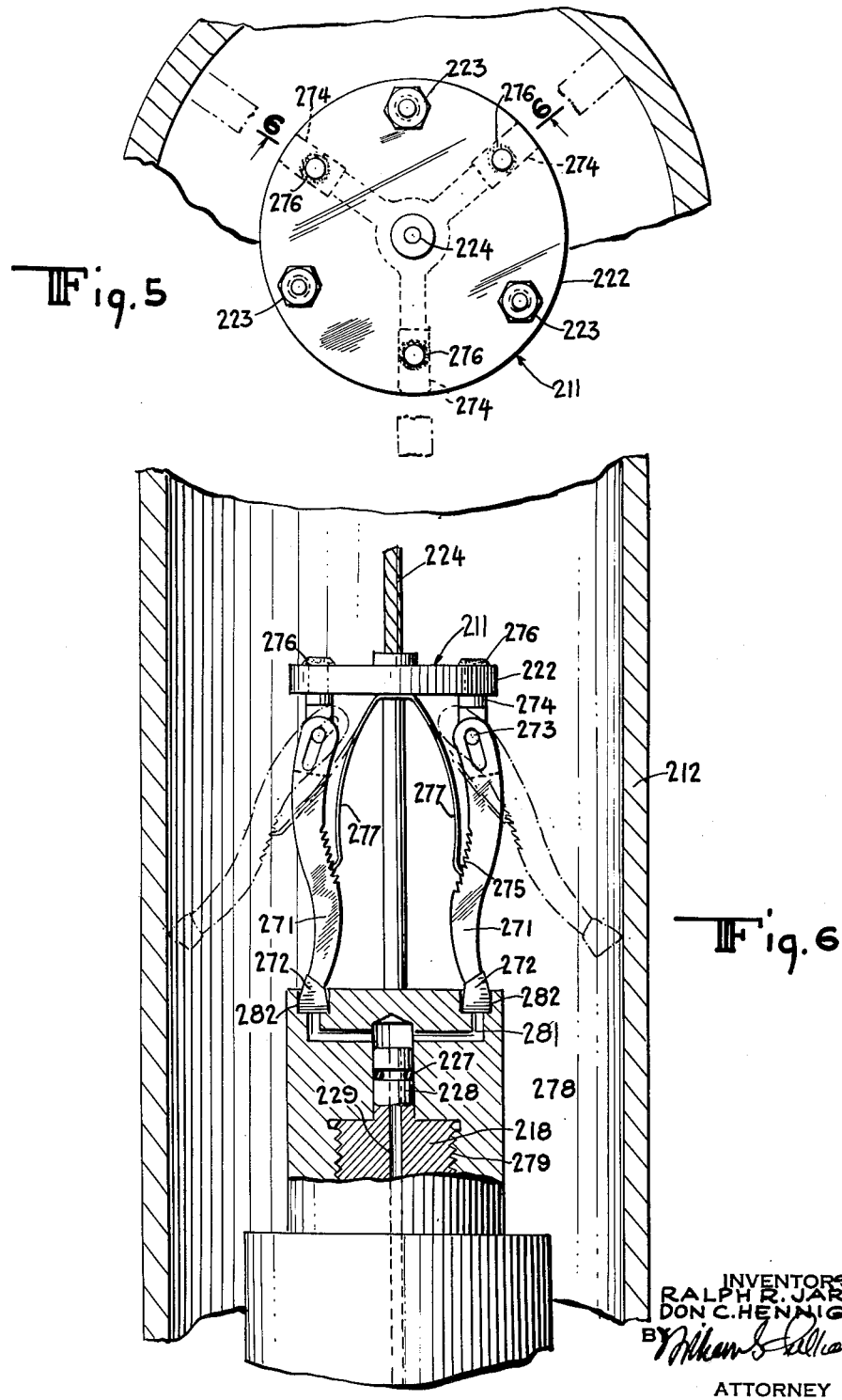

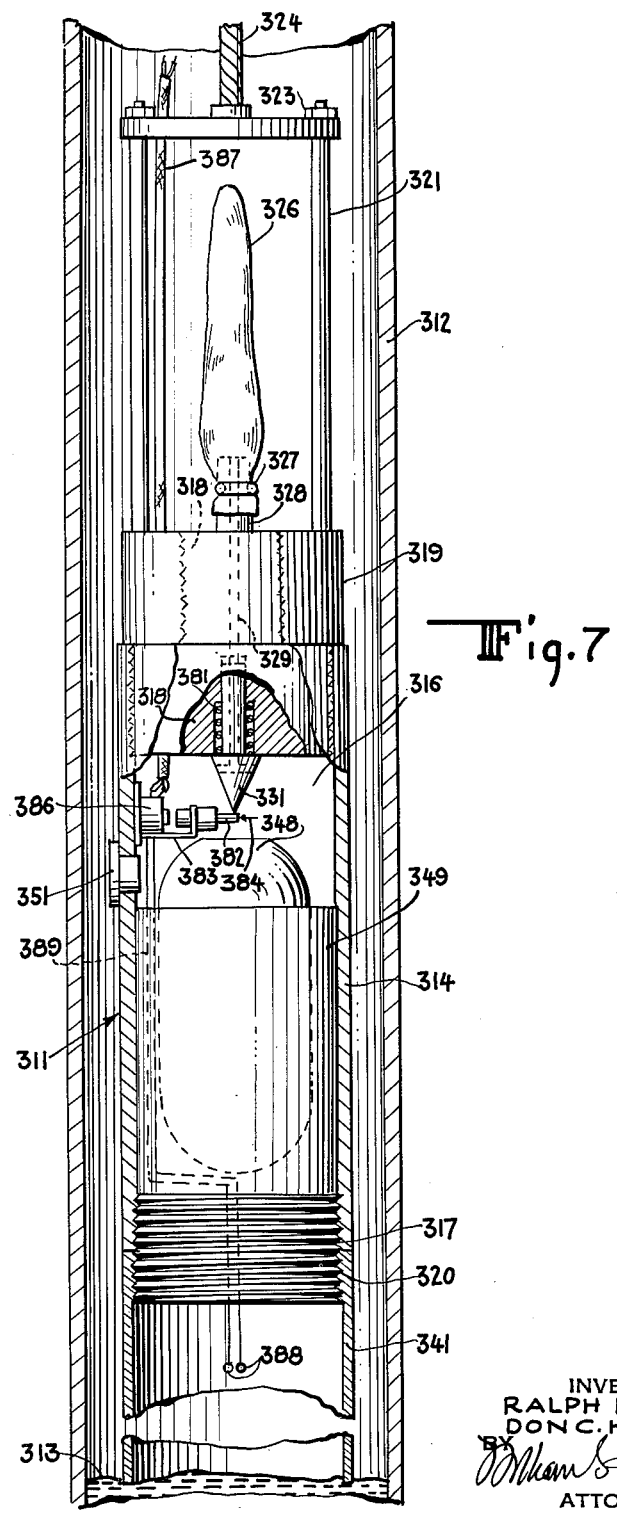

United States Patent Office 3,126,742
Patented Mar. 31, 1964

3,126,742
LIQUID LEVEL INDICATING TOOL
Ralph R. Jarboe, Jr., Tulsa, Okla., and Don C. Hennigan, Madison, Kans.; said Hennigan assignor to Cities Service Research and Development Company, New York, N.Y., a corporation of New Jersey
Filed Mar. 14, 1960, Ser. No. 26,391
(Filed under Rule 47(a) and 35 U.S.C. 116)
18 Claims. (Cl. 73—290)

This invention relates to liquid level indicating tools and more particularly to a down hole liquid level indicating tool adapted to be lowered down a conduit to determine the level of a body of liquid in a down hole portion of the conduit.

In many instances, especially in connection with oil wells, it becomes necessary to determine the upper level of a body of liquid in a down hole portion of a conduit. The level desired may be the upper level of liquid in the conduit or may be the upper level of a body of electrically conductive liquid such as brine which is beneath a layer of non-conductive liquid such as oil.

Many devices have previously been proposed for measuring the level of a body of liquid in a down hole portion of a conduit such as a string of drill tubing. While some of these devices have proved succesful in some instances they have proven to be unsuitable for many applications. At the present time, for instance, there is no reliable and easy method for logging liquid levels in a well having small sized tubing. Liquid levels in such tubing must be found by conventional methods such as by pulling the tubing and running a non-positive float type indicating device or by using sonic logging devices, which are complicated and require the services of skilled technicians. Such methods are frequently expensive, clumsy and sometimes very unreliable.

In the use of a float type liquid level indicating device, for example, it is frequently difficult to obtain accurate results because of the relatively light weight of the float as compared with the weight of the wire line on which it is being lowered. The reduction in the total strain on the wire line as the float is buoyed by the liquid is thus frequently quite small and hard to detect, especially at relatively greater depths. In addition to having an adverse effect upon the accuracy of results obtained with such devices, this problem becomes more severe as the size of the indicating tool is decreased and makes it practically impossible to use float type liquid level indicating devices in small conduits, such as those less than about 4 inches in diameter.

It is an object of the present invention to provide an improved down hole liquid level indicating tool.

It is another object of the invention to provide a liquid level indicating device which may be used in relatively small sized tubing.

It is another object of the invention to provide an improved down hole liquid level indicating device which is positive acting.

According to a preferred embodiment of the invention a down hole liquid level indicating tool is provided which is adapted to be lowered down a conduit containing a body of liquid in a down hole portion thereof. The liquid level indicating tool has a fluid pressure chamber and means for providing pressure in the fluid pressure chamber when the tool penetrates the body of liquid in the conduit. Means operable by said fluid pressure are provided for positively engaging the wall of the conduit to thereby halt further downward movement of the tool. The level of liquid in the conduit may then be readily determined by measuring the length of wire or line paid out in lowering the tool to the point where further downward movement is halted as described above. The added resistance to upward movement of the tool caused by the above mentioned engagement of the conduit wall insures against any mistake in determining the level of the liquid.

For a better understanding of the invention reference should be had to the accompanying drawings in which:

FIGURE 1 is a plan view showing a down hole liquid level indicating tool constructed in accordance with the invention;

FIGURE 2 is a sectional elevation view taken as indicated by line 2—2 of FIGURE 1;

FIGURE 3 is a plan view showing a portion of another liquid level indicating tool constructed in accordance with the invention;

FIGURE 4 is a front elevation view of a portion of the indicating tool shown in FIGURE 3;

FIGURE 5 is a plan view of a portion of another liquid level indicating tool constructed in accordance with the invention;

FIGURE 6 is a sectional elevation view with some parts removed taken along line 6—6 of FIGURE 5, and FIGURE 7 is a sectional elevation view similar to FIGURE 2 and showing yet another liquid level indicating tool constructed in accordance with the invention.

Referring to the drawings and more especially to FIGURES 1 and 2, a down hole liquid level indicating tool 11 is shown positioned in a down hole portion of a conduit 12, which may, for instance, be a string of conventional drill tubing positioned within an oil well. The conduit 12 may be of any suitable diameter and the indicating tool 11 may, of course, be constructed in a size appropriate to the diameter of the conduit. The liquid level indicating tool 11 is especially useful in conduits of relatively small diameter, such as less than about 4 inches but may, of course, be used in larger conduits. The liquid level indicating tool 11 is of a type which is especially designed to indicate the upper level of a body of liquid 13 such as water or crude oil in the conduit 12 as shown in FIGURE 2.

The liquid level indicating tool 11 has a generally tubular body portion 14 containing a fluid pressure chamber 16 formed within the body portion 14 by upper and lower end pieces 18 and 17 respectively. The upper and lower end pieces may be secured to the body portion 14 by any suitable means such as by conventional threads as indicated at 15 and 20. The end piece 18 is shown here in the form of a universal head having an upper threaded portion adapted to receive suitable fittings such as 19. The fitting 19 serves to secure the lower ends of rods such as 21, while the upper ends of these rods may be held in spaced relation by suitable means such as plate 22. Nuts such as 23 may be provided on the upper ends of the rods 21. Suitable means such as a wire line 24 may be secured to the plate 22 as shown for lowering the liquid level indicating tool 11 down the conduit 12. The framework formed by the fitting 19, rods 21 and plate 22, in addition to supporting the indicating tool 11 from the wire line 24, also provides space within which suitable means may be positioned for engaging the wall of the conduit 12 in response to penetration of the body of liquid 13 by the indicating tool as described below. As shown in FIGURE 2, the means for engaging the wall of the conduit may take the form of an expansible bladder 26 of suitable material such as rubber. The bladder 26 may be secured in place by any suitable means such as by the use of an O ring 27 to secure the bladder about a nipple 28 which may project from the upper portion of the universal head 18 as shown. The interior of the bladder 26 is in fluid communications with the fluid pressure chamber 16 by suitable means such as a fluid passageway 29 passing through the nipple 28 and universal head 16 as shown. The passageway 29 may continue from the universal head 16 through a striker 31 fixed in position on the lower surface of the universal head for use as described below.

The body 14 of the liquid level indicating tool 11 has a lower portion 41 which extends downwardly below the lower end piece 17 and is preferably joined to the remainder of the body 14 by the end piece 17 in any suitable manner such as by the use of threads 20. The lower body portion 41 houses a piston 43 having a piston rod 44 extending through a suitable opening 46 in the end piece 17 into the fluid pressure chamber 16. Leakage of fluid through the opening 46 is prevented by suitable means such as conventional O rings 47. It is readily apparent that when the lower body portion 41 of the liquid level indicating tool 11 penetrates the body of liquid 13 as the indicating tool is lowered down the conduit 12 the liquid will exert an upward force on the piston 43 thereby pushing the piston rod 44 further into the fluid pressure chamber 16. Such movement of the piston 43 and piston rod 44 is used to provide fluid pressure within the fluid pressure chamber 16 in any suitable manner such as by releasing fluid under pressure from a container or by creating fluid pressure by a suitable chemical reaction. In the particular form of liquid level indicating tool shown in FIGURE 2 a container or vessel 48 containing suitable fluid such as carbon dioxide or other gas under pressure is provided and may, for instance, be positioned in a housing member 49. Movement of the piston rod 44 into the fluid pressure chamber 16 as described above forces the housing member 49 and fluid pressure container 48 towards the upper portion of the fluid pressure chamber 16. When utilizing this particular form of indicating tool the indicating tool should be lowered down the conduit 12 sufficiently rapidly so that the upward force exerted against the piston 43 by the liquid 13 forces the fluid pressure container 48 upwardly against the striker 31 with sufficient force so that the striker punctures the container 48 thereby releasing the compressed gas from the container 48. The compressed gas thus released within the fluid pressure chamber 16 passes through the fluid passageway 29 and inflates or expands the bladder 26 so that the bladder engages or grips the wall of the conduit 12 as shown in dotted lines with sufficient friction to halt further downward movement of the indicating tool 11.

In order to reduce the quantity or pressure of the fluid under pressure which must be stored in the container 48 or which must be created by other suitable means such as by chemical reaction within the fluid pressure chamber 16, it is preferred to provide suitable means such as a conventional check valve 51 for allowing the pressure within the fluid pressure chamber 16 to be increased as the pressure in the conduit 12 increases. Thus, as the liquid level indicating tool 11 is lowered down the conduit 12, the pressure within the fluid pressure chamber 16 will remain approximately equal to the perssure in the conduit 12 as the pressure in the conduit 12 increases. However, when the pressure within the fluid pressure chamber 16 is increased, as by releasing compressed gas as described above, the check valve 51 will prevent such pressure from escaping into the conduit 12.

It is apparent that a liquid level indicating tool of the type described above provides a simple, positive indication of the level of a body of liquid such as 13 in the down hole portion of a conduit such as 12. Unlike conventional float type indicating tools it is unnecessary to depend entirely upon a mere lessening of weight on the wire line such as 24 when the indicating tool has reached the liquid level since the positive gripping action of the means such as the bladder 26 against the wall of the conduit will provide very noticeable resistance when the liquid level indicating tool is raised. This resistance to raising the tool provides a positive indication that the tool has indeed reached the level of the liquid and is a considerably more reliable indication of liquid level than could be provided by a float type tool. The bladder 26 or other gripping means should not, of course, engage the wall of the conduit 12 in such a way as to prevent raising of the indicating tool since one of the advantages of tools constructed in accordance with the present invention is that they may be easily reused. In order to reuse the indicating tool 11 it is necessary only to remove same from the conduit and unscrew the body portion 41 and bottom end piece 17 from the body portion 14. The housing member 49 may then be removed and the container 48 replaced with a fresh container of compressed gas.

FIGURES 3 and 4 show portions of a liquid level indicating tool 111 which is similar in design and operation to the indicating tool 11 described above in connection with FIGURES 1 and 2 with the exception of the features described below. Components of the indicating tool 111 which are similar to corresponding components of the indicating tool 11 are indicated by reference numerals the last two digits of which are the same as the reference numerals of the corresponding components of the indicating tool 11.

The indicating tool 111 differs from the indicating tool 11 only in that the bladder 126 of the liquid level indicating tool 111, unlike the bladder 26 of the indicating tool 11, does not directly engage the wall of the conduit but rather serves to force suitable gripping members against the wall of a conduit 112 when inflated in response to penetration of a body of liquid by the indicating tool as described above in connection with indicating tool 11. In the liquid level indicating tool 111 shown in FIGURES 3 and 4, a plurality of gripping members is provided in the form of legs 161. The legs 161 are pivotly secured in any suitable manner such as by the use of pins 162 passing through a plate 122. The plate 122 may be provided with openings 163 to allow free movement of the upper portion of the legs 161 in pivoting about the pins 162.

While the tool is being lowered down the conduit 112 the legs 161 may swing freely from the pins 162 as shown in solid lines in FIG. 4 since the bladder 126 in its deflated condition does not force the legs against the wall of the conduit. When the bladder 126 is inflated in response to penetration of a body of liquid by the indicating tool 111, the expanded bladder forces the legs 161 against the wall of the conduit 112 as indicated in dotted lines in FIGURE 4 to thereby engage the wall of the conduit and prevent further downward movement of the indicating tool. The portions of the legs 161 which come in contact with the wall of the conduit are preferably provided with gripping surfaces of suitable material such as rubber, but such special surfaces are not essential and may be dispensed with if desired. The use of gripping members such as the legs 161 enables a more positive gripping action to be obtained with relatively lower fluid pressure or relatively smaller quantities of compressed gas and also avoids subjecting the bladder 126 to the wear to which the bladder 26 is subjected when the liquid level indicating tool 11 is pulled from the conduit 12 with the inflated bladder 26 in gripping engagement with the wall of the conduit. The portions of the legs 161 in contact with the conduit 12 during withdrawal of the tool may be of material better adapted to withstand the abrasion caused by withdrawing the tool while the bladder is in inflated condition than would be possible in the case of the bladder, which must be made of inflatable material.

FIGURES 5 and 6 show portions of a liquid level indicating tool 211 which is similar in design and operation to the liquid level indicating tool 11 described above in connection with FIGURES 1 and 2 except for the features described below. Components of the indicating tool 211 which are similar to corresponding components of the indicating tool 11 are indicated by reference numerals the last two digits of which are the same as the reference numerals of the corresponding components of the indicating tool 11.

The indicating tool 211 differs from the indicating tool 11 in that, in the indicating tool 211, the means for engaging the wall of a conduit 212 comprises legs 271 which preferably have rubber tipped end portions 272 to provide good frictional engagement with the wall of the conduit. The legs 271 are pivotly mounted about suitable means such as pins 273 which pass through supporting members 274 which may in turn be mounted in any suitable manner such as by being passed through a plate 222 and secured thereto by suitable means such as welding as indicated at 276. The legs 271 are preferably slotted where they are mounted on the pins 273 in order to allow the legs to move upwardly a short distance with respect to the plate 222 when they are released from their contracted position as described below. Spring means, shown here as springs 277, are provided for urging the legs 271 outwardly into an expanded position as shown in dotted lines in FIGURE 6. In the expanded position gripping feet 272 of the legs 271 are in gripping engagement with the walls of the conduit 212. Prior to the time when the legs 271 are released into the expanded condition in response to entry of the indicating tool 211 into a body of liquid the legs are retained in a contracted position as shown in solid lines in FIGURE 6. In order to retain the legs 271 in the contracted position a retaining member 278 may be screwed on to the upper portion of a universal head 218 as indicated at 279. The retaining member 278 is provided with fluid passageways 281 which are in fluid communication with a passageway 229 running through the universal head and a nipple 228 as shown. The passageways 281 open into recesses 282 in the upper portion of the retaining member 278. The recesses 282 are adapted to receive and retain the end portions 272 of the legs 271.

In lowering the indicating tool 211 down the conduit 212 the legs 271 are retained in the recesses 282 against the urging of the springs 277 until such time as the indicating tool penetrates a body of liquid. At this time gas under pressure is released within the tool as described above in connection with indicating tool 11. This gas is transmitted through the passageways 229 and 281 and serves to eject the end portions 272 of the legs 271 from the recesses 282. The springs 277 then force the legs 271 into their expanded position as shown in solid lines in FIGURE 6. In this position the end portions 272 of the legs are in gripping engagement with the interior wall of the conduit 212. The legs 271 are preferably provided with portions such as serrated portions 275 adapted to engage the springs 277 to more positively retain the legs 271 in the expanded condition once they are released from the contracted position and forced into the expanded condition by the springs 277.

FIGURE 7 shows a liquid level indicating tool 311 which is especially adapted to activate means for gripping the wall of a conduit 312 in response to entry of the liquid level indicating tool 311 into a body of electrically conductive liquid 313 such as brine. The liquid level indicating tool 311 is especially useful where it is desired to measure the liquid level of salt water in a conduit containing salt water and also other liquid such as petroleum since, as described below, the conduit engaging portion of the indicating tool is not activated until the tool penetrates the conductive liquid even though the tool may first penetrate a body of non-conductive liquid such as oil. The liquid level indicating tool 311 is similar in design and operation to the liquid level indicating tool 11 described above in connection with FIGURES 1 and 2 except for the features described below. Components of the indicating tool 311 which are similar to corresponding components of the indicating tool 11 are indicated by reference numerals the last two digits of which are the same as the reference numerals of the corresponding components of the indicating tool 11.

The liquid level indicating tool 311 shown in FIGURE 7 has an end piece 317 which may be solid except for suitable passageways for allowing passage of wires as described below.

In the indicating tool 311 a striker 331 is positioned so as to be urged downwardly from an end piece 318 by spring means such as a spring 381. Prior to the time the indicating tool 311 penetrates a body of conductive liquid the striker 331 is retained in position against the urging of the spring 381 by suitable means such as a retaining pin 382. The retaining pin 382 is slidably mounted on suitable means such as a bracket 383 so that it may move in the direction indicated by an arrow 384 in response to the magnetic action of a solenoid 386 which is positioned within a body portion 314 of the indicating tool. The solenoid 386 is activated in response to penetration of the conductive liquid 313 by the indicating tool 311. Electrical energy for operating the solenoid 386 may be supplied from a suitable source through wires 387. Wires 389 extend from the solenoid 386 through the end piece 317 and terminate in contacts 388 in a lower body portion 341 of the indicating tool. The wires 389 form a part of the electrical circuit including the helix of the solenoid so that the solenoid cannot be activated until electric current can flow between the contacts 388. Thus electricity may be continuously supplied through the wires 387 while the indicating tool 311 is being lowered through the conduit 312, but the solenoid 386 will not operate to release the striker 331 until the contacts 388 become immersed in the conductive liquid. When the indicating tool 311 penetrates the body of conductive liquid 313 the solenoid 386 is activated by passage of current between the contacts 388 and draws the release pin 382 in the direction indicated by the arrow 384 thus releasing the striker 331 which is then forced against a fluid pressure container 348 by the spring 381 with sufficient force to puncture the container and release compressed gas therefrom into a fluid pressure chamber 316. The compressed gas passes through a passageway 329 and inflates a bladder 326. The wall of the conduit 312 is engaged by the bladder 326 and further downward movement of the liquid level indicating tool 311 is prevented. With this modification of the invention the conduit wall is gripped in response to the completion of an electrical circuit upon penetration of a body of conductive liquid by the indicating tool. The speed with which the indicating tool is lowered down the conduit is, therefore, completely immaterial and it is not necessary to maintain any particular rate of descent.

While the invention has been described above with respect to certain preferred embodiments thereof, it will be understood by those skilled in the art that various changes and modifications are possible without departing from the spirit and scope of the invention and it is intended to cover all such changes and modifications in the appended claims.

We claim:

1. A down hole liquid level indicating tool adapted to be lowered down a conduit containing a body of liquid, said tool comprising a fluid pressure chamber, means for providing pressure in said fluid pressure chamber in response to penetration of said body of liquid by said tool, and means operable by said fluid pressure for engaging the wall of said conduit.

2. Apparatus of the character described comprising a down hole liquid level indicating tool adapted to be lowered down a conduit having a body of liquid in a down hole portion thereof, and means for lowering said tool down said conduit, said tool comprising a fluid pressure chamber, means for providing pressure in said fluid pressure chamber in response to penetration of said body of liquid by said tool, and means operable by said fluid pressure for engaging the wall of said conduit to thereby halt further downward movement of said tool.

3. A down hole liquid level indicating tool adapted to be lowered down a conduit containing a body of liquid in a down hole portion, thereof, said tool comprising fluid pressure expansible means adapted to engage the wall of said conduit when expanded, and means for expanding said fluid pressure expansible means in response to penetration of said body of liquid by said tool.

4. A down hole liquid level indicating tool adapted to be lowered down a conduit containing a body of liquid in a down hole portion thereof which comprises a container of pressurized fluid, means for releasing fluid under pressure from said container in response to penetration of said body of liquid by said tool, and means operable by said released fluid under pressure for engaging the wall of said conduit.

5. A liquid level indicating tool adapted to be lowered down a conduit containing a body of liquid in a down hole portion thereof, said tool comprising a fluid pressure chamber, means for increasing pressure in said fluid pressure chamber to the pressure level within the conduit as said tool is lowered down said conduit, means for increasing the pressure in said fluid pressure chamber to a pressure substantially in excess of the pressure within said conduit in response to penetration of said body of liquid by said tool, and means operable by said last mentioned pressure increase for engaging the wall of said conduit.

6. Apparatus of the character described comprising a down hole liquid level indicating tool adapted to be lowered down a conduit having a body of liquid in a down hole portion thereof, and means for lowering said tool down said conduit, said tool comprising a fluid pressure chamber, a piston movable in an upward direction in response to penetration of said body of liquid by said tool, a vessel containing fluid under pressure positioned within said fluid pressure chamber, means for releasing fluid under pressure from said vessel in response to upward movement of said piston, and means operable by said released fluid under pressure for engaging the wall of said conduit to thereby halt further downward movement of said tool.

7. Apparatus of the character described comprising a down hole liquid level indicating tool adapted to be lowered down a conduit having a body of liquid in a down hole portion thereof, and means for lowering said tool down said conduit, said tool comprising a piston movable in response to penetration of said body of liquid by said tool, a vessel containing fluid under pressure, means for releasing fluid under pressure from said vessel in response to movement of said piston, and means operable by said released fluid under pressure for engaging the wall of said conduit to thereby halt further downward movement of said tool.

8. In apparatus of the character described, a liquid level indicating tool adapted to be lowered down a conduit having a body of liquid in a down hole portion thereof, said tool comprising an elongated generally tubular body, a fluid pressure chamber in said body being defined by upper and lower end pieces positioned respectively within said body, said body having a lower portion extending below said lower end piece, said lower portion being joined to the remainder of said body by said lower end piece, a piston positioned within said lower portion of said body and having a piston rod extending through said lower end piece into said fluid pressure chamber, said piston and piston rod being movable upwardly by said liquid in response to penetration of said liquid by said lower body portion of the tool, a fluid pressure container positioned within said fluid pressure chamber for movement within said fluid pressure chamber in response to upward movement of said piston rod, a striker positioned within said fluid pressure chamber and adapted to puncture said container thereby releasing fluid under pressure from same in response to said movement of said container within said pressure fluid chamber, and a fluid pressure expansible bladder in fluid communication with said fluid pressure chamber whereby said bladder is expandable into engagement with the wall of said conduit by fluid pressure released from said container as described above.

9. In apparatus of the character described, a liquid level indicating tool adapted to be lowered down a conduit having a body of liquid in a down hole portion thereof, said tool comprising an elongated generally tubular body, a fluid pressure chamber in said body, a piston positioned within a lower portion of said body and having a piston rod extending into said fluid pressure chamber, said piston and piston rod being movable by said liquid in response to penetration of said liquid by said lower body portion, a fluid pressure container positioned within said fluid pressure chamber for movement within said fluid pressure chamber in response to movement of said piston rod, a striker positioned within said fluid pressure chamber and adapted to puncture said container thereby releasing fluid under pressure from same in response to said movement of said container within said pressure fluid chamber, and a fluid pressure expansible bladder in fluid communication with said fluid pressure chamber whereby said bladder is expandable into engagement with the wall of said conduit by fluid pressure from said container as described above.

10. In apparatus of the character described, a liquid level indicating tool adapted to be lowered down a conduit having a body of liquid in a down hole portion thereof, said tool comprising a body, a piston positioned within a lower portion of the said body, said piston being movable by said liquid in response to penetration of said liquid by said lower body portion of the tool, a fluid pressure container, a striker adapted to puncture said container thereby releasing fluid under pressure from same in response to said movement of said piston, and fluid pressure expansible means in fluid communication with said container whereby said fluid pressure expansible means is expandable into engagement with the wall of said conduit by fluid pressure released from said container as described above.

11. Apparatus of the character described comprising a down hole liquid level indicating tool adapted to be lowered down a conduit having a body of liquid in a down hole portion thereof, and means for lowering said tool down said conduit, said tool comprising a plurality of gripping members for engaging the wall of said conduit in response to fluid pressure to thereby halt further downward movement of said tool, and means for supplying said fluid pressure in response to penetration of said body of liquid by said tool.

12. Apparatus of the character described comprising a down hole liquid level indicating tool adapted to be lowered down a conduit having a body of liquid in a down hole portion thereof, and means for lowering said tool down said conduit, said tool comprising a plurality of gripping members adapted in an expanded condition to grip the wall of said conduit, spring means positioned to urge said gripping members into said expanded condition, said gripping members having portions adapted to engage said spring means to retain said gripping members in said expanded condition, means for retaining said gripping members in a contracted condition and means for releasing said gripping members from said contracted position in response to penetration of said body of liquid by said tool.

13. Apparatus of the character described comprising a down hole liquid level indicating tool adapted to be lowered down a conduit having a body of liquid in a down hole portion thereof, and means for lowering said tool down said conduit, said tool comprising a plurality of gripping members adapted in an expanded condition to grip the wall of said conduit, spring means positioned to urge said gripping members into said expanded condition, means for retaining said gripping members in a contracted condition and means for releasing said gripping members from said contracted position in response to penetration of said body of liquid by said tool.

14. Apparatus of the character described comprising a down hole liquid level indicating tool adapted to be lowered down a conduit having a body of liquid in a down hole portion thereof, and means for lowering said tool down said conduit, said tool comprising a plurality of gripping members adapted in an expanded condition to grip the wall of said conduit, fluid pressure expansible means positioned to urge said gripping members into said expanded condition by expansion of said fluid pressure expansible means, and means for expanding said fluid pressure expansible means in response to penetration of said body of liquid by said tool.

15. A down hole liquid level indicating tool adapted to be lowered down a conduit containing a body of electrically conductive liquid in a down hole portion thereof, said tool comprising an electrical circuit adapted to be completed by immersion in said liquid, means for providing fluid pressure within said tool in response to the completion of said electrical circuit, and means operable in response to said fluid pressure for engaging the wall of said conduit.

16. A down hole liquid level indicating tool adapted to be lowered down a conduit containing a body of electrically conductive liquid in a down hole portion thereof, said tool comprising an electrical circuit adapted to be completed by immersion in said liquid, a fluid pressure chamber, means for providing fluid pressure within said fluid pressure chamber in response to the completion of said electrical circuit, and means operable in response to said fluid pressure for engaging the wall of said conduit.

17. An indicating tool for locating oil-brine interfaces, said tool being adapted to be lowered down a conduit having in a down hole portion thereof an upper layer of oil and a lower layer of brine with an oil-brine interface there between, said tool comprising an electrical circuit adapted to be completed by immersion in said brine, means for creating fluid pressure within said tool in response to the completion of said electrical circuit, and means operable in response to said fluid pressure for engaging the wall of said conduit.

18. An apparatus of the character described, a liquid level indicating tool adapted to be lowered down a conduit containing a body of electrically conductive liquid in a down hole portion thereof, said tool comprising a body portion, a fluid pressure container, a spring loaded striker, a solenoid, retaining means for retaining said striker in an inoperative position, said solenoid being adapted to be operable by completion of an electric circuit in response to penetration of said liquid by said tool to thereby operate said restraining means to allow said striker to puncture said container thereby releasing fluid under pressure from same, and means operable in response to said release of fluid under pressure to grip the wall of said conduit thereby preventing further downward movement of said tool.

References Cited in the file of this patent
UNITED STATES PATENTS

| | | |
|---|---|---|
| 2,134,428 | Scherbatskoy et al. | Oct. 25, 1938 |
| 2,458,631 | Parks | Jan. 11, 1949 |
| 2,582,530 | Daetwiler | Jan. 15, 1952 |
| 2,966,946 | McCulloch et al. | Jan. 3, 1961 |